United States Patent [19]

Edwards

[11] Patent Number: 4,930,640
[45] Date of Patent: Jun. 5, 1990

[54] TWO-SIDED STORAGE SYSTEM

[76] Inventor: Walter H. Edwards, 13300 SW. 55th St., Fort Lauderdale, Fla. 33330

[21] Appl. No.: 363,927

[22] Filed: Jun. 9, 1989

[51] Int. Cl.$^5$ .................................................. A47F 5/00
[52] U.S. Cl. ........................................ 211/41; 211/45; 211/50; 211/135
[58] Field of Search ............... 211/41, 45, 50, 135, 211/134, 59.2

[56] References Cited

U.S. PATENT DOCUMENTS

| | | | |
|---|---|---|---|
| 1,666,074 | 4/1928 | Steinhilber | 211/45 |
| 1,802,060 | 4/1931 | Neely | 211/50 X |
| 2,523,908 | 9/1950 | Johnsen | 211/45 X |
| 3,169,812 | 2/1965 | Gronkvist et al. | 211/45 X |
| 4,119,207 | 10/1978 | Fuller et al. | 211/45 |
| 4,604,061 | 8/1986 | Willcocks et al. | 211/45 X |

Primary Examiner—Robert W. Gibson, Jr.
Attorney, Agent, or Firm—Robert M. Schwartz; Edward I. Mates

[57] ABSTRACT

A two-sided storage system or bin comprising a plurality of flat, rigid shelves arranged in a zig-zag vertical arrangement in such a manner that alternate shelves of the system or bin are located in alternate oblique planes extending transversely of the shelves at an acute angle preferably not exceeding 15 degrees, in alternating opposite directions from horizontal. The system or bin provides access openings to compartments converging transversely from said access openings on each longitudinal side of the system or bin for a pair of operators working simultaneously on opposite sides of the system or bin and prevents each operator from interfering with the work of the other operator. The oblique support planes for the shelves improves the vision area of each operator over what would exist if the shelves extended horizontally. Furthermore, the amount of space occupied by the two operators working simultaneously along the opposite longitudinal sides of the system or bin is only slightly more than what a single operator occupies.

7 Claims, 1 Drawing Sheet

TWO-SIDED STORAGE SYSTEM

FIELD OF THE INVENTION

The present invention relates to a storage system or bin. More specifically, this invention relates to a storage system or bin in which two persons operating from opposite sides of a storage system or bin can load alternate shelves of the storage system or bin for flat objects such as negatives for films and the like without interfering with the operation of the operator working from the opposite longitudinal side of the system or bin.

BACKGROUND OF THE INVENTION AND PATENTS OF INTEREST

When working in an office or a work place having limited work space, it is necessary to store articles such as printing negatives on a flat while making printing plates or masters. However, the storage system of this invention is capable of being used in any arrangement which requires the systematized compilation or assembly of individual units forming part of a set that is not to be mixed or confused with other sets involving different orders.

In work areas having relatively small space for work, the amount of work that can be done is limited by the access areas available for loading work pieces onto the shelves of a storage system or bin. It would be desirable to utilize the available space in a work area more efficiently by enabling two people to work on a single storage system or bin without having the work of one person interfere with that of the other. It would also be desirable to enable two people to work on opposite sides of the storage system or bin and have ready access to the shelves oriented in such a manner that each operator working on each side of the storage system or bin can readily observe what is located on each individual shelf of the side of the storage system or bin without disturbing the operator working on its opposite side.

As will be evident from a discussion of prior art and patents that were discovered during a novelty search for this invention, the prior art failed to provide as efficient an operation as the present invention provides. The following patents are called to the attention of the Examiner to indicate the inventor's knowledge of the state of the art at the time the applicant executed the present application.

U.S. Pat. No. 721,532 to Baron, issued Feb. 24, 1903, shows a music cabinet for storing sheet music. A number of vertically spaced horizontally oriented shelves is provided from a continuous strip of fabric. The strip of fabric constitutes two series of shelves closed at one side, those of each series opening on the side of the frame at which the others are closed. Unless the horizontal shelves are widely spaced from one another by having relatively thick rollers horizontally disposed and mounted at their ends in support posts for the cabinet, it is difficult for a person operating with sheet material to observe what sheet material is stored on any of the shelves. It would be beneficial if the field of view for each worker working on opposite sides of the cabinet could be improved.

U.S. Pat. No. 725,851 to Kopp, issued Apr. 21, 1903, discloses a bread or cake rack comprising a series of vertically spaced supports. Each of the supports comprises a pair of shelves that slope toward one another in an inward downward direction. This inward and downward slope prevents the breads or cakes stored on the rack from tending to fall off the rack when the rack is moved from place to place.

U.S. Pat. No. 1,368,192 to Olmstead, patented Feb. 8, 1921, shows a music roll cabinet comprising a series of racks, each consisting of a single piece of metal in the nature of a flat plate or body and formed between its ends to provide an upstanding stop flange or rest in the nature of a rib extending entirely across the plate. The racks are parallel to one another and arranged at an angle to the horizontal so that the stop flange or rest is at the lower longitudinal side edge of each rack.

U.S. Pat. No. 1,700,976 to Bulman, issued Feb. 5, 1929, shows a display rack for holding merchandise or other articles in either a horizontal or inclined position. The trays may be carried either in a horizontal plane parallel to the horizontal planes of the other trays or in downward and inwardly inclined position to prevent the articles from falling off the display rack when the latter is moved.

U.S. Pat. No. 1,752,699 to Ross, issued Apr. 1, 1930, shows a combination shoe and hosiery stand. This stand comprises shelves obliquely and downwardly disposed in parallelism within a cabinet and adapted to dispose their innermost ends for contacting engagement with work pieces in the manner shown in FIG. 4 of the drawings.

U.S. Pat. No. 1,787,552 to Rice, issued Jan. 6, 1931 shows a filing cabinet adapted for filing tickets or the like. The cabinet comprises shelves composed of metal, rubber, wood or other suitable material and the shelves form parts of compartments having two stop members at the opposite openings of each compartment. The stop members are constructed and arranged in such a manner that when one stop member of a pair is moved to a non-obstructing position, the opposite stop member is moved into an obstructing position. Therefore, the compartment has an opening at one end or the other end and a closed end opposite the open end, so that regardless of which end is chosen to be open, the opposite end is automatically closed when the first end is opened.

U.S. Pat. No. 1,992,106 to Wee, issued Feb. 19, 1935, shows a meat rack having trays so mounted thereon that they may be easily and quickly loaded and unloaded without removing the trays from the rack. The trays are also capable of being removed entirely from the rack when so desired.

U.S. Pat. No. 3,465,897 to Schumann et al., issued Sept. 9, 1969, shows a storage arrangement in which a rack having spaced opposite sides supports a plurality of vertically superimposed pallets, each of which is movable independently of the others between a central position in which it is located wholly within the compartments of the rack and two end positions in each of which it extends partially beyond one or the other of the opposite sides of the rack.

It will be obvious from a study of these patents which represent the prior art that no patent teaches the use of vertically aligned shelves, vertically adjacent of which extend traversely obliquely in opposite directions from a horizontal plane to provide separate access from opposite sides of the system as well as providing an oblique plane of support unique for each side of the system that improves the field of view for an operator working from one side only or the opposite side only of the system. This arrangement enables each operator to operate independently of the other operator and also have better vision of what is being stored on the shelves to which his work load is assigned. Also, the provision of alternate transverse obliquity for adjacent shelves enables the space within a storage or work area to be used efficiently by enabling two operators to work simultaneously from opposite sides of the same storage area so that two workers can operate in a space that is only slightly larger than the space needed by a single operator working without this invention.

DESCRIPTION OF THE DRAWINGS

In the drawings that form part of a description of a preferred embodiment of this invention.

DESCRIPTION OF PREFERRED EMBODIMENT

Figure 1:
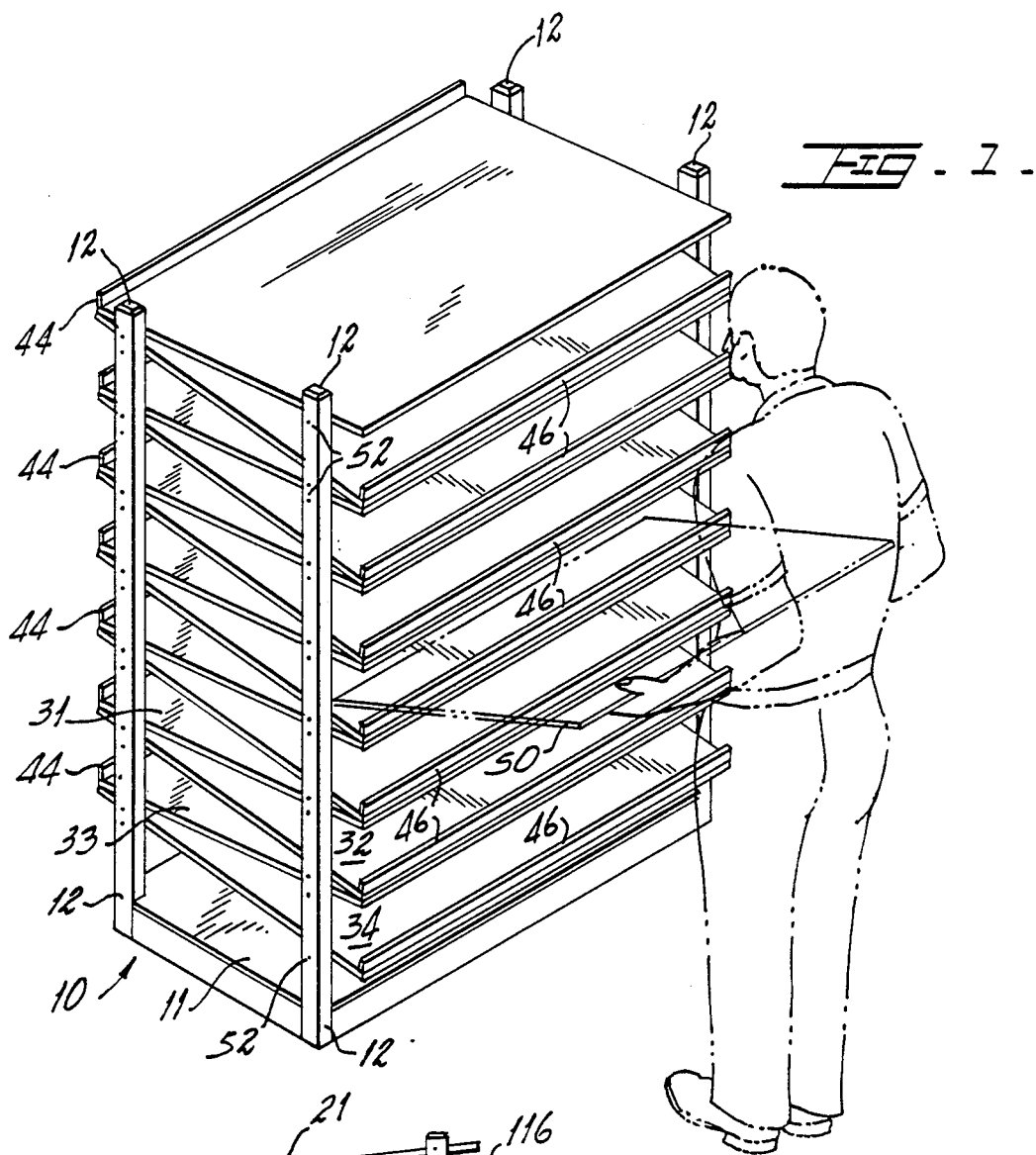
FIG. 1 is a perspective view of a storage system conforming to this invention showing how an operator can hold a flat supporting work pieces to be stored on one of the oblique shelves in a series of compartments on the side of the system to which that operator is assigned.

Referring to the drawings, a two sided storage system 10 is shown provided with a horizontal base 11 preferably of rectangular outline shape and a plurality of vertically extending posts 12 extending upward from their bottom portions that are fixed to base 11 adjacent each of the four corners of base 11. The base 11 and vertically extending posts 12 provide a shelf support means for the storage system or bin of this invention. The storage system or bin has a first longitudinal side 14 and a second longitudinal side 16.

Figure 2:
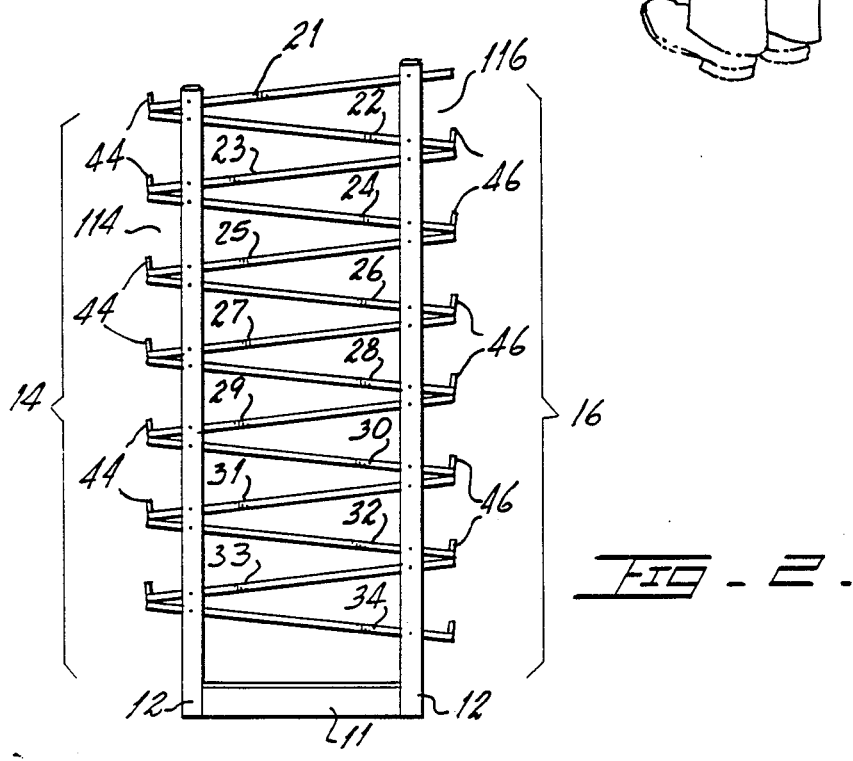
FIG. 2 is an end elevational view of the system depicted in FIG. 1.

The shelf support means comprising said base 11 and said vertically extending posts 12 supports a series of flat rigid shelves 21, 22, 23, 24, 25, 26, 27, 28, 29, 30, 31, 32, 33, and 34. The aforesaid flat rigid shelves are constructed and arranged in a zig-zag vertical configuration in such a manner that alternate shelves are located in alternate oblique planes extending transversely of said shelves at an acute angle in alternating opposite directions from the horizontal. Each of said shelves has substantially uniform longitudinal dimensions and substantially uniform transverse dimensions from shelf to shelf and each of the shelves are preferably of rectangular outline. As seen in elevation in FIG. 2, the odd numbered shelves, 21, 23, 25, 27, 29, 31 and 33 are arranged along parallel planes extending obliquely downward to the left and the alternate even numbered shelves, 22, 24, 26, 28, 30, 32 and 34 are arranged along parallel planes extending obliquely downward to the right of the view of FIG. 2. Each of the odd numbered shelves has its lower side edge disposed along the first longitudinal side 14 of system or bin 10 and each even numbered shelf has its lower longitudinal side edge disposed along the second longitudinal side 16 of system or bin 10.

A longitudinal extending ledge 44 is provided along substantially the entire length of each of the odd numbered shelves along the first longitudinal side 14. Also, a longitudinally extending ledge 46 extends along substantially the entire length of the lower longitudinal side edge of the even numbered shelves along the second longitudinal side 16.

The lower longitudinal edge of each of the shelves 21–34 is supported by the vertically extending posts 12 in such a manner that the lower longitudinal side edge of each shelf is either vertically adjacent or engages the upper edge of its next succeeding lower shelf of the zig-zag configuration. In this manner, openings 114 are provided outside the upper surfaces of the odd numbered shelves for an operator working along the first longitudinal side 14 of the system or bin 10 and openings 116 are provided outside the upper surfaces of the even numbered shelves for an operator working along the second longitudinal side 16 of system or bin 10. It is obvious from the view of FIG. 2 that an operator working along the first longitudinal side 14 of the storage system or bin of this invention has access only to a first set of compartments that converge transversely from access openings 114 and is prevented from having access to a second set of compartments that converge transversely from the access openings 116, whereas an operator operating along the second longitudinal side 16 of system or bin 10 has access only to the second set of compartments that converge transversely from access openings 116 but is prevented from having access to the first set of compartments that converge transversely from access openings 114.

The two operators can work simultaneously from opposite sides of the apparatus without interfering with the work of one another. The present invention enables the two operators to work simultaneously in an area just slightly larger than that previously required for a single operator working a bin occupying the same space as system or bin 10.

The angle of obliquity to the horizontal for each of the obliquely supported shelves need not be very great, but merely sufficient to improve the field of vision of the operator working along either side of the system or bin through access opening 114 or 116 onto the upper surface of each visible oblique shelf of the compartments said operator faces and to enable said operator to load or unload a work piece which is being systematically collected to be part of a group of work pieces belonging to a particular work order assigned to a particular compartment for accumulation.

A particular benefit of this invention occurs when a flat support member 50, shown in FIG. 1, is used to support a group of associated negatives thereon. Each operator can load each individual group of associated negatives on a different flat support member 50 and mount each support member 50 on any one of the shelves accessible to said operator that is available for storage that is selected to store said group until such time as the entire work order is to be unloaded. The operator working along the other side of storage system or bin 10 can work simultaneously on another work order unrelated to said first work order.

In order to assure that the flat support members 50 do not slide over the longitudinal ledges 44 or 46 (depending upon whether they are stored by an operator working on the first longitudinal side 14 or the second longitudinal side 16 of the system or bin 10), the angle of obliquity of each shelf is preferably limited to a small angle which still provides an adequate access opening for the operator and yet does not provide too great an angle of obliquity that would cause any negative or work piece to slide off the flat support member 50. Longitudinal ledges 44 and 46 are limited in height to be just high enough to hold flat support members 50 and their supported negatives along the bottom longitudinal side edges of the transversely oblique shelves and yet not so high as to interfere with the insertion and/or removal of a said flat support member 50 into and/or from a compartment that converges transversely from its associated access opening 114 or 116.

It is preferable that all of the shelves be of equal size and that each shelf be supported in a plane having an oblique angle not exceeding about 15 degrees in order to obtain the combined benefit of providing an operator with improved visibility into the compartments accessible to said operator while avoiding the possibility that flat support members 50 slide off the oblique upper support surfaces by the shelves.

While any well known means may be used to fix the shelves to the shelf support means, a preferable arrangement is to provide a series of dowels 52 along the length of the vertically extending posts 12 in the locations where the longitudinal end portions of the individual shelves intersect posts 12. The longitudinal end portions of each of the shelves 21-34 should be provided with recesses to receive dowels 52 so that the entire structure can be supported in a rigid manner by dowels 52 attaching one pair of four posts 12 to one common longitudinal end portion of the shelves and the other pair of said four posts 12 to the opposite common longitudinal end portion of said shelves. The use of dowels is preferred if the shelves and support posts 12 are composed of wood. However, other materials may be used for the shelves as is well known in the art of storage, and any well known fastening means other than dowels may be used to secure shelves 21-34 to posts 12.

A system of fourteen shelves has been illustrated. This number is merely exemplary. The number of shelves may be changed without departing from the gist of this invention.

Conforming to the requirements of the patent statutes for adequate disclosure of this invention, this specification has explained the principal, preferred construction and mode of operation of this invention and has illustrated and described what is now considered to be its best embodiment. It is understood, however, that, within the scope of the claimed subject matter that follows, the invention may be practiced otherwise than as specifically illustrated and described.

What is claimed is:

1. A two-sided storage system or bin comprising shelf support means and a plurality of flat, rigid shelves supported thereby in a zig-zag vertical arrangement relative to said shelf support means in such a manner that alternate of said shelves are located in alternate oblique planes extending transversely of said shelves at an acute angle in alternating opposite directions from the horizontal, said storage system or bin having a first longitudinal side and a second longitudinal side, each of said flat, rigid shelves having a first longitudinal side edge extending along said first longitudinal side and a second longitudinal side edge extending along said second longitudinal side, the first longitudinal side edge of each alternate one of said shelves substantially abutting the first longitudinal side edge of one of said shelves vertically adjacent thereto to one side thereof to form a closed transverse side of a compartment along said first longitudinal side of said system or bin and vertically spaced from the first longitudinal side edge of another one of said vertically adjacent shelves to the other vertical side thereof to form a first access opening along said first longitudinal side to a compartment that converges transversely inward from said access opening, the second longitudinal side edge of said one alternate shelf substantially abutting the second longitudinal side edge of said other one of said vertically adjacent shelves to said other vertical side thereof to form a closed transverse side of another compartment along said second longitudinal side of said system or bin and vertically spaced from the second longitudinal side edge of said one of said vertically adjacent shelves to said one vertical side of said alternate one of said shelves to form a second access opening to a compartment, said second access opening extending along said second longitudinal edge of said system or bin, each vertically adjacent upper surface accessible along substantially the entire length of said shelf, adjacent of said shelves being accessible from alternate sides of said system or bin from the top shelf to the bottom shelf of said system or bin.

2. A system as in claim 1, wherein each of said shelves has a first longitudinal end portion and a second longitudinal end portion and said shelf support means comprises a first pair of vertically extending attachment posts rigidly connected to said first longitudinal end portions and a second pair of vertically extending attachment posts rigidly connected to said second longitudinal end portions.

3. A system or bin as in claim 1, wherein one of said longitudinal side portions of each of said shelves is lower than the other longitudinal side portion of said shelf, further including raised abutment means constructed and arranged to extend along the lower longitudinal side portion of each of said shelves at the access opening to each of said compartments to prevent slippage of objects supported on the upper surfaces of said shelves.

4. A system or bin as in claim 1, wherein all of said shelves have substantially uniform longitudinal dimensions and substantially uniform transverse dimensions from shelf to shelf, said shelves being constructed and arranged so that said first longitudinal side edges of said shelves are aligned in a first vertical plane along said first longitudinal side of said system or bin and said second longitudinal side edges of said shelves are aligned in a second vertical plane along said second longitudinal side of said system or bin.

5. A system or bin as in claim 1, wherein said alternate shelves lie in planes comprising a first set of oblique planes parallel to one another and another set of oblique planes parallel to one another and oblique to said first set of oblique planes.

6. A system or bin as in claim 5, wherein all of said shelves lie in oblique planes whose obliquity defines an angle with the horizontal not exceeding 15 degrees.

7. A system or bin as in claim 1, wherein said zig-zag vertical arrangement provides alternate elongated access openings along opposite longitudinal sides of said system or bin to vertically adjacent of said compartments for operators working simultaneously along opposite longitudinal sides of said system or bin.

* * * * *